Figure 19:
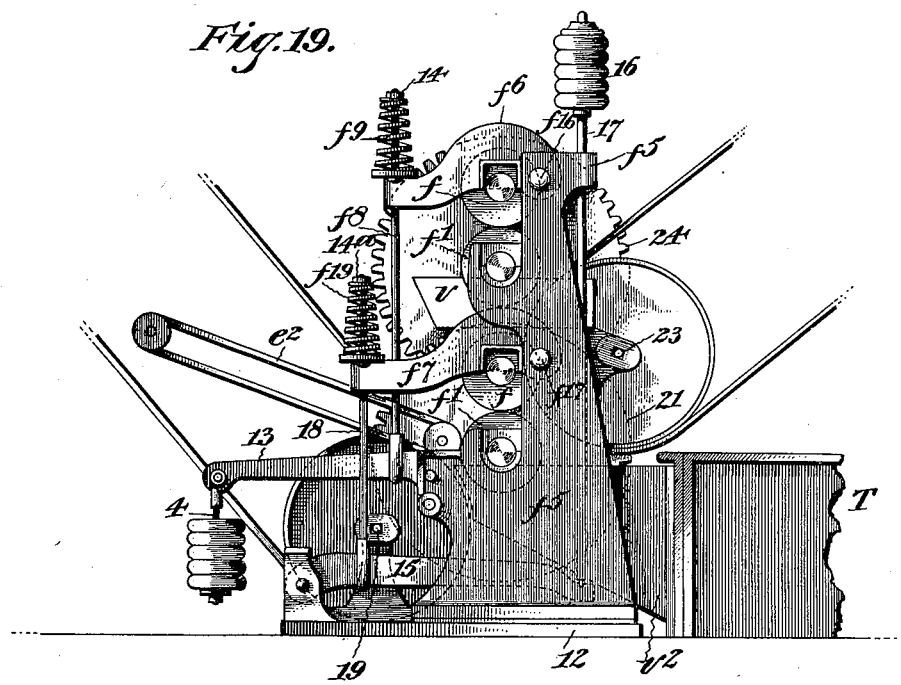

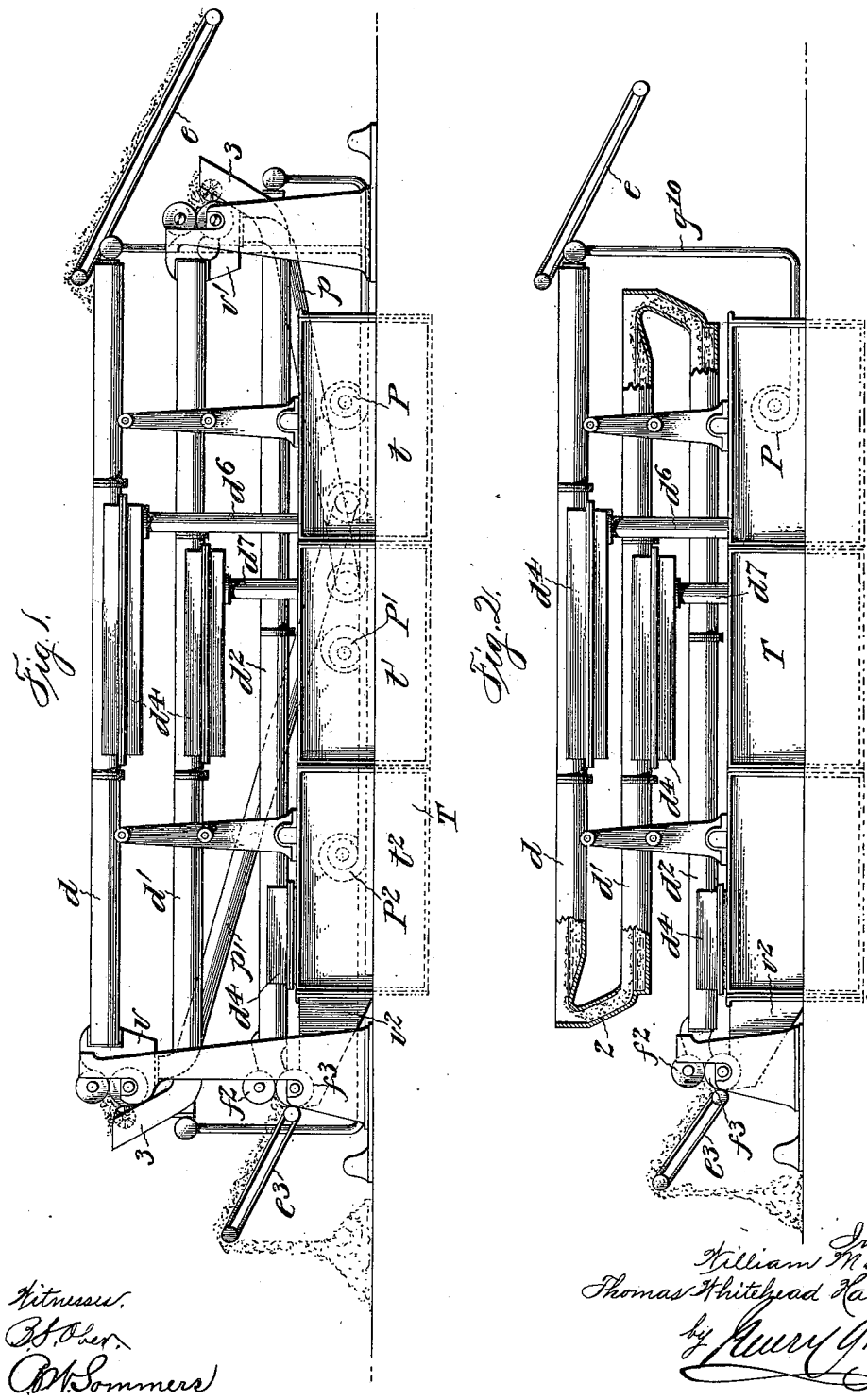

No. 650,728. Patented May 29, 1900.
W. McNAUGHT & T. W. HAWKINS.
WOOL WASHING MACHINE.
(Application filed Nov. 2, 1897.)
(No Model.) 8 Sheets—Sheet 2.
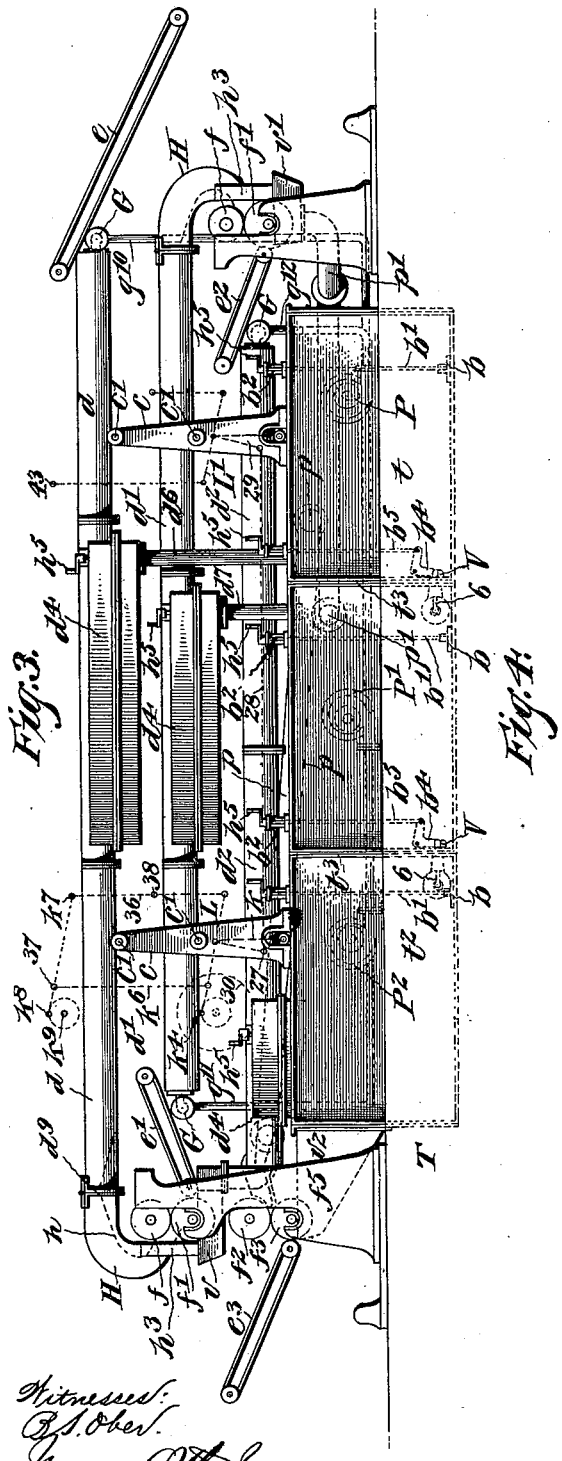
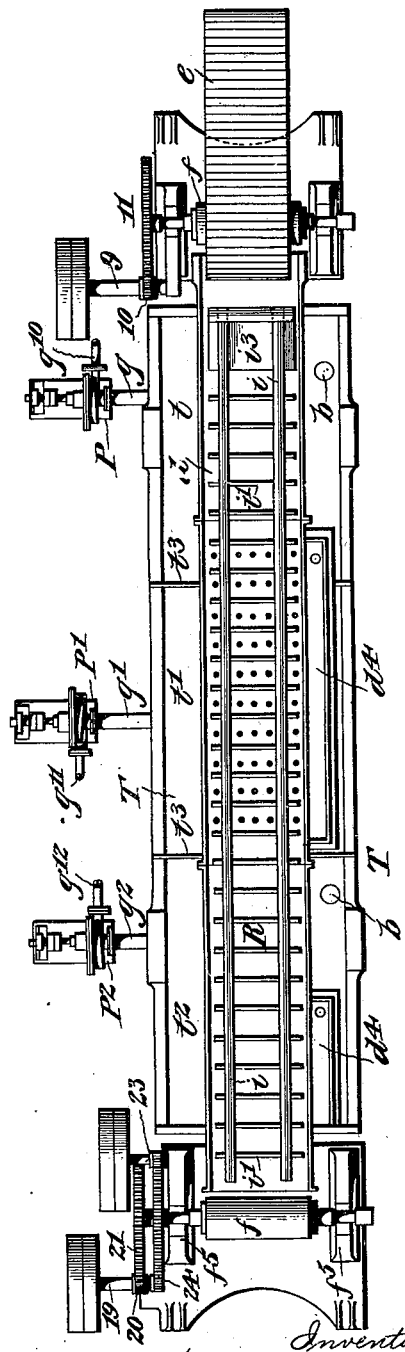
Witnesses:
Inventors:
William McNaught.
Thomas Whitehead Hawkins.
By Henry Orth
Attorney.

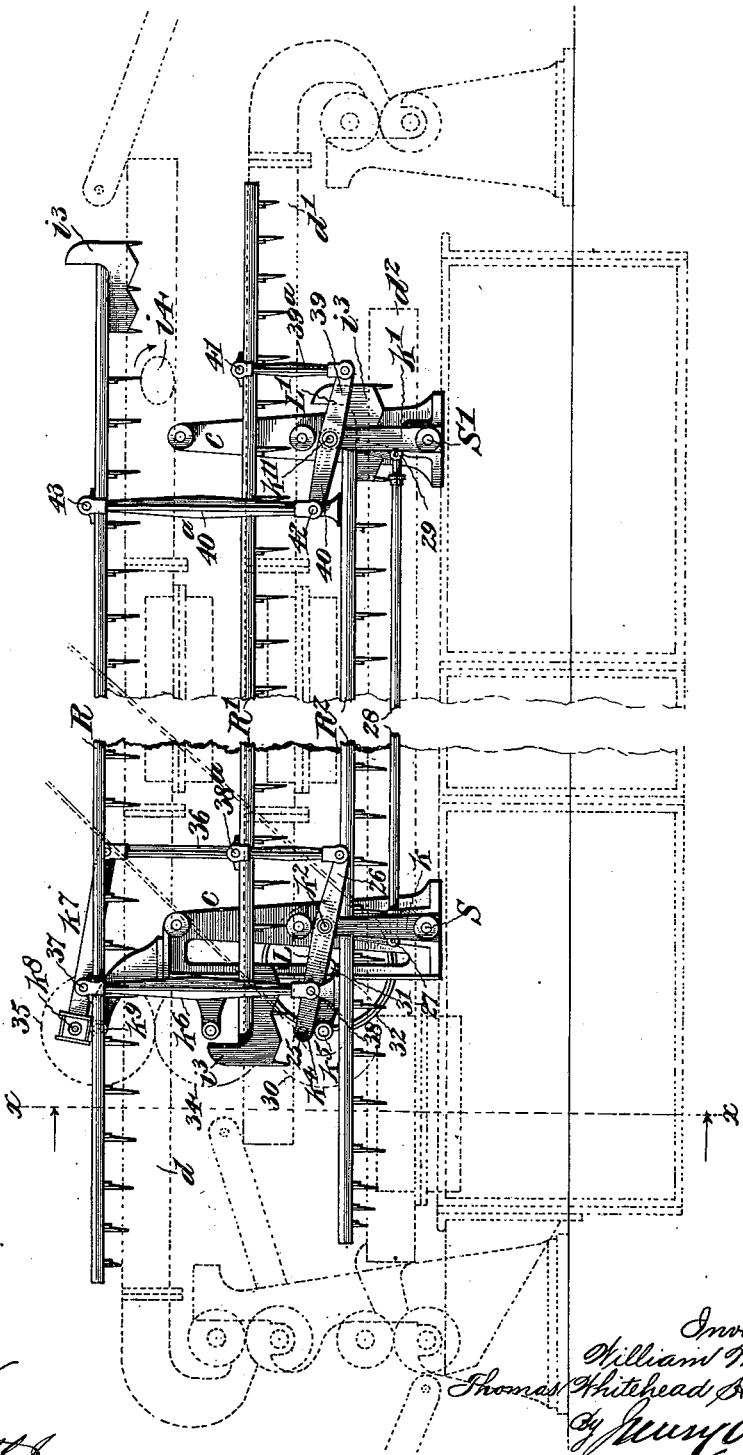

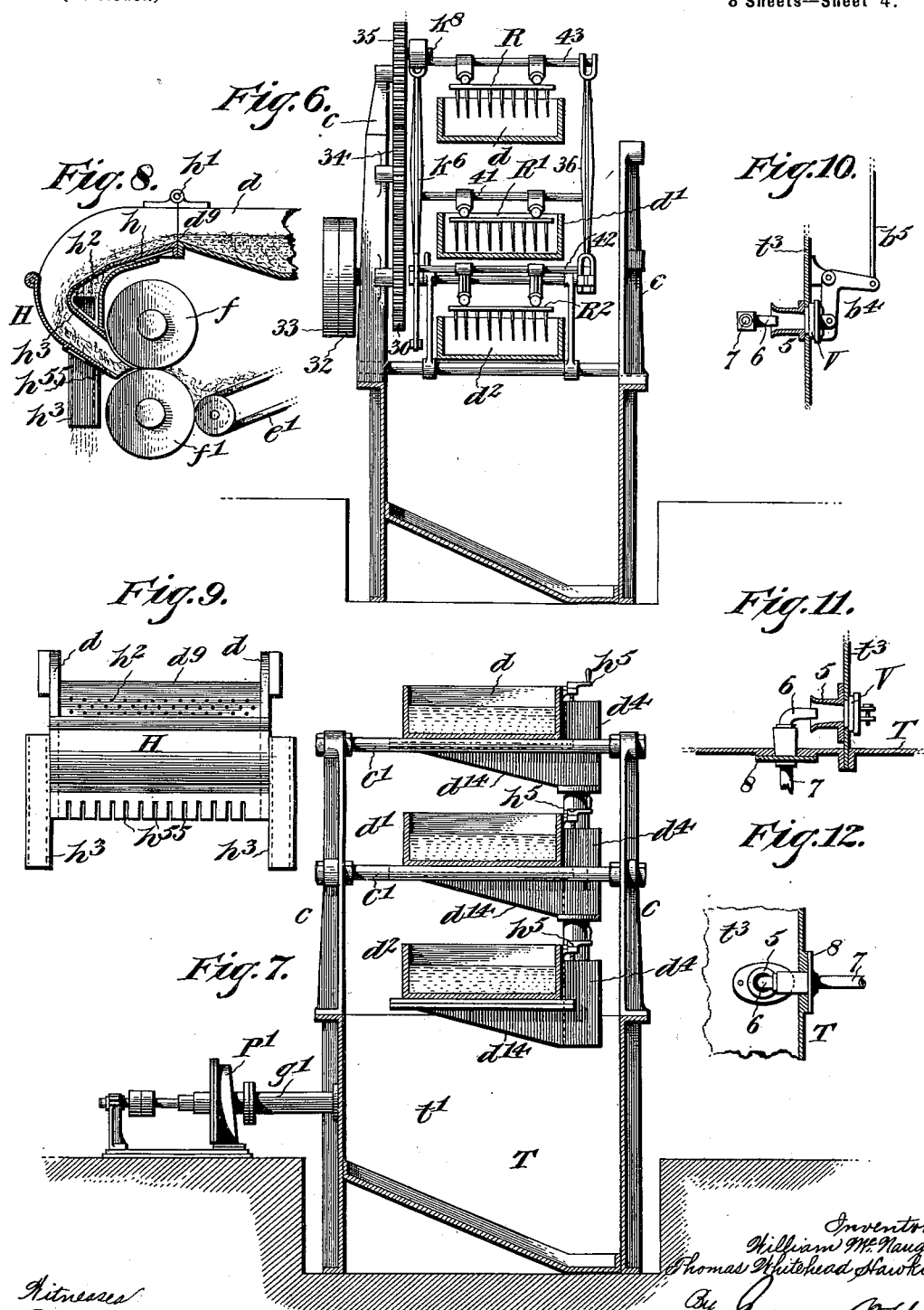

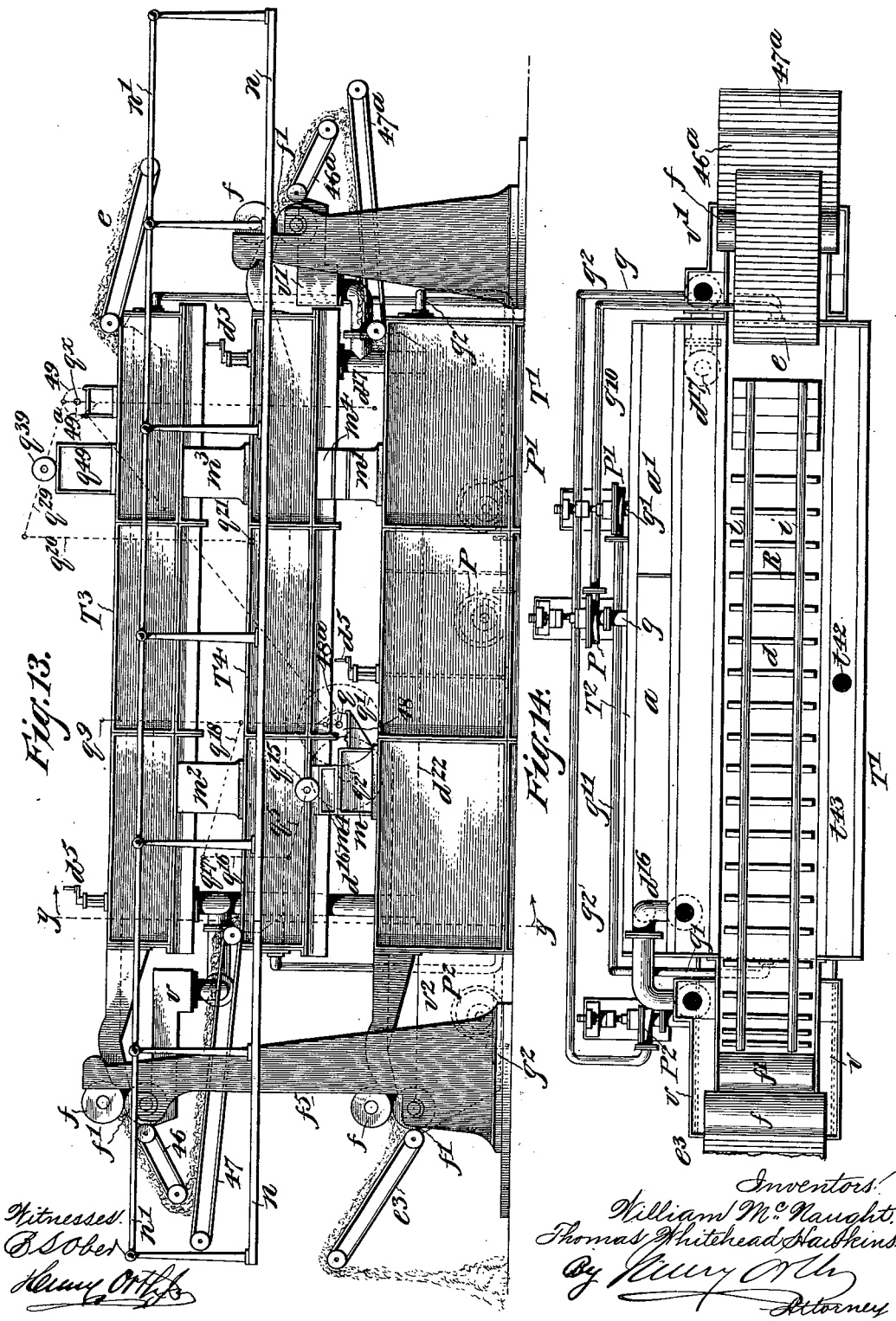

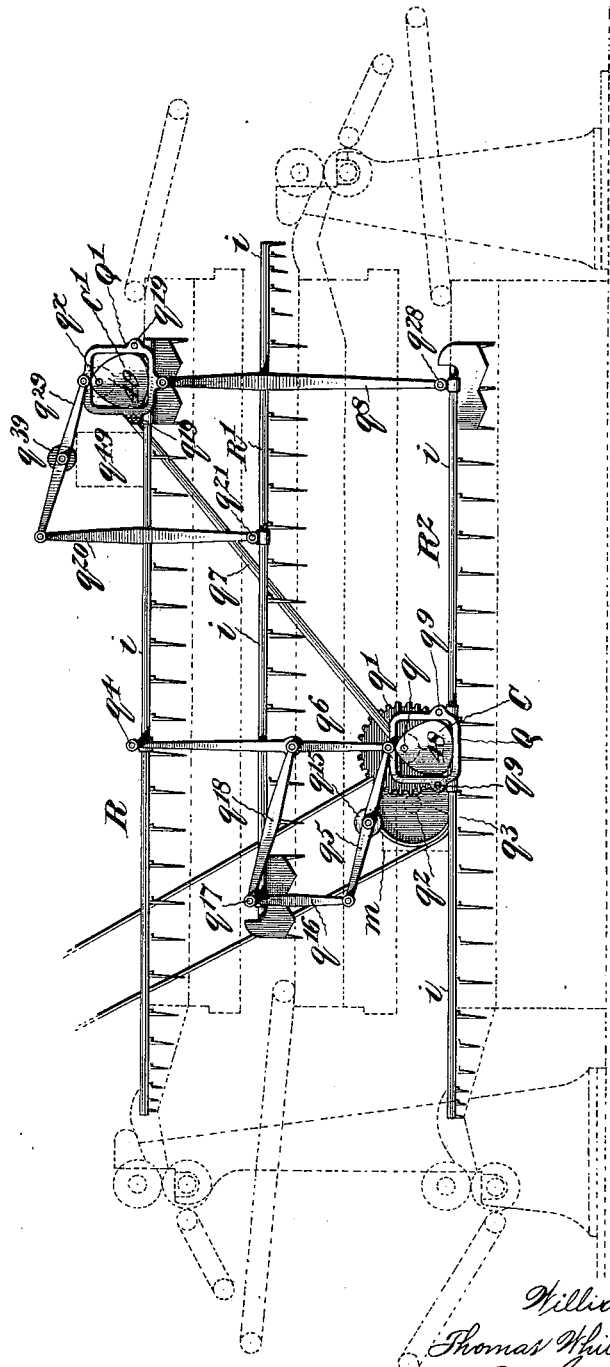

No. 650,728. Patented May 29, 1900.
W. McNAUGHT & T. W. HAWKINS.
WOOL WASHING MACHINE.
(Application filed Nov. 2, 1897.)
(No Model.) 8 Sheets—Sheet 7.
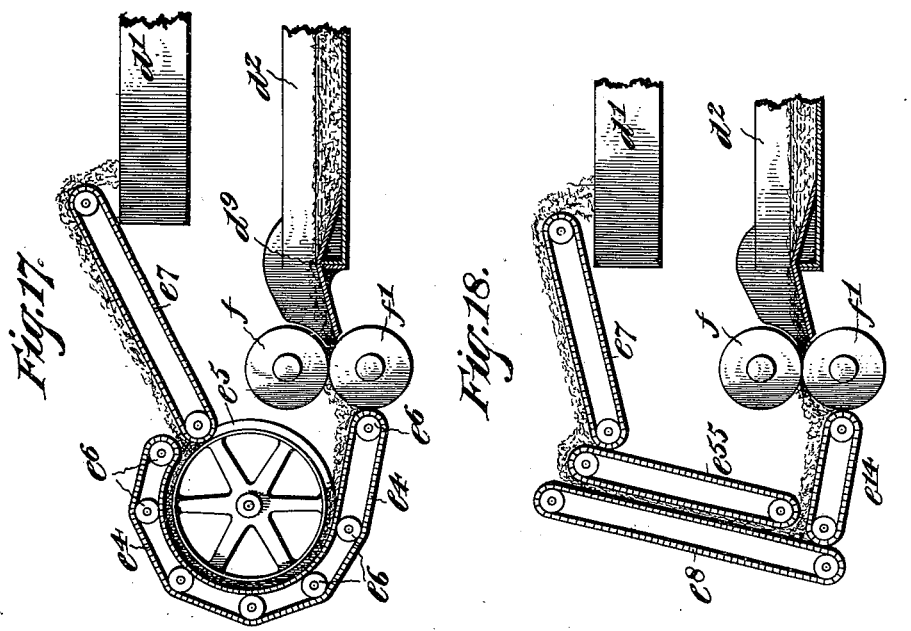
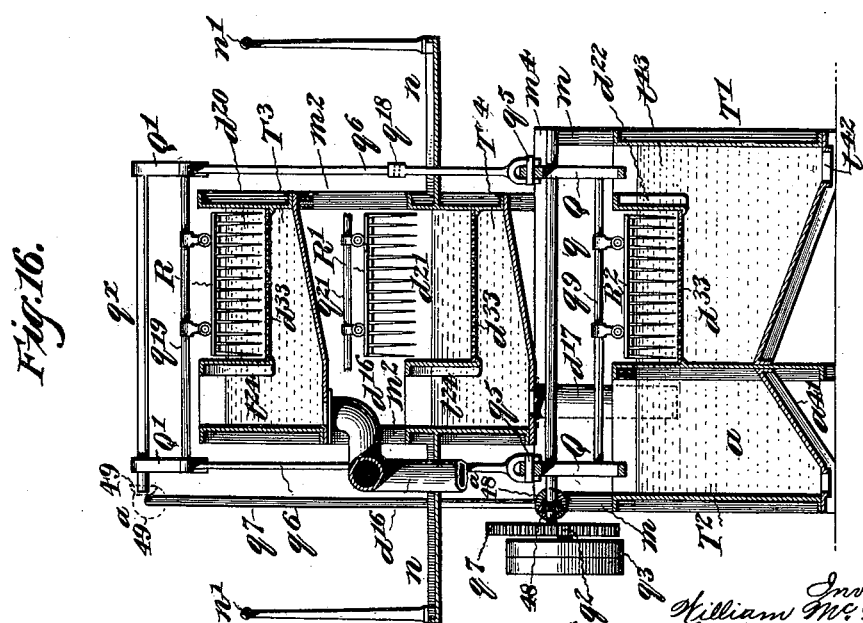
Witnesses:
B. J. Ober
[signature]
Inventors:
William McNaught,
Thomas Whitehead Hawkins.
By [signature]
Attorney No. 650,728. Patented May 29, 1900.
W. McNAUGHT & T. W. HAWKINS.
WOOL WASHING MACHINE.
(Application filed Nov. 2, 1897.)
(No Model.) 8 Sheets—Sheet 8.

Witnesses:
C. S. Ober.

Inventors:
William McNaught,
Thomas Whitehead Hawkins.
By Henry Orth
Attorney.

THE NORRIS PETERS CO., PHOTO-LITHO., WASHINGTON, D. C.

UNITED STATES PATENT OFFICE.

WILLIAM McNAUGHT AND THOMAS WHITEHEAD HAWKINS, OF ROCHDALE, ENGLAND.

WOOL-WASHING MACHINE.

SPECIFICATION forming part of Letters Patent No. 650,728, dated May 29, 1900.

Application filed November 2, 1897. Serial No. 657,192. (No model.)

*To all whom it may concern:*

Be it known that we, WILLIAM MCNAUGHT and THOMAS WHITEHEAD HAWKINS, of Rochdale, county of Lancaster, England, have invented certain new and useful Improvements in Machines for Scouring and Washing Wool and other Fibrous Materials, (for which Letters Patent have been obtained in Great Britain, dated the 19th of April, 1894, No. 7,784, and Belgium, dated the 19th of July, 1897, No. 129,599;) and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

In scouring or washing fibrous materials, particularly wool, it is necessary to subject the same repeatedly to the action of a scouring or washing liquid. This has before our invention been done by passing the fibrous material through a number of machines placed end to end or side by side. This arrangement requires, of course, a comparatively-large space, which cannot always be provided. On the other hand, each of the machines has its separate rake and squeezing-rolls, driving mechanism, appliances for the supply of the scouring or washing liquid, pumps or other mechanism for returning the liquid carried out of the troughs by the material back to said troughs, &c.

Our invention has for its object a construction of scouring or washing machine, whereby the above-recited disadvantages are obviated; and it consists, essentially, in arranging a number of scouring or washing troughs or tanks—two, three, or more, as may be required—one above the other, in the means for transferring the fibrous material swept over the delivery end of a trough to the next one above or below, and so on from one trough to the other of the series, the feed end of one trough being arranged above or below the delivery end of the next succeeding trough, in the provision of a supply-tank for each trough adapted to receive the liquid swept out of the trough or contained in its settling-tank, in means for returning such liquid to the respective troughs, in the mechanism for imparting to the immersing and propelling rakes the proper movements, so that the material delivered from the delivery end of a trough to the feed end of the next trough below or above will be forwarded by the rake of such receiving-trough to the opposite end thereof, and so on; or, in other words, so that the rakes of the superposed troughs will propel the material alternately in opposite directions.

The invention further consists in the arrangement of the several sets of squeezing-rolls at one and the same end of the machine, and in other features of construction and combinations of parts, as hereinafter described, and set out in the claims.

In the accompanying drawings, Figure 1 is a side elevation, partly in section, of a washing-trough constructed in accordance with our invention, the immersing and propelling rakes and the mechanism for operating the same being removed. Fig. 2 is a side elevation of a modified construction of the washing-machine shown in Fig. 1, showing squeezing-rolls applied at the delivery end of each of the superposed washing-troughs. Fig. 3 is a like view illustrating a modified construction of appliances for transferring the material from one trough to another, the rakes and their operating mechanism being likewise removed, but showing the center lines of said mechanism in dotted lines. Fig. 4 is a top plan view of the machine shown in Fig. 3. Fig. 5 is a side elevation of the rakes and rake-operating mechanism, the machine being shown in dotted lines for the sake of clearness. Fig. 6 is a cross-section of the machine, taken about on line $x\ x$ of Fig. 5, looking toward the right, certain parts being omitted. Fig. 7 is a like view designed to more clearly show the construction of the washing-troughs. Fig. 8 is a detail sectional side view of the appliances shown in Fig. 3 for transferring the material from one trough to another. Fig. 9 is an end view of the delivery-chute. Figs. 10 and 11 show in vertical and horizontal sections, and Fig. 12 in a section at right angles to the plane of Fig. 11, a valve and injector for the transfer of the scouring or washing liquid from one settling-tank to another. Fig. 13 is a side elevation of a machine involving our invention and showing certain structural modifications, the rakes, and rake-operating mechanism, except the center lines thereof, which are omitted; and Fig. 14 is a plan view thereof, also showing the rake for the upper trough. Fig. 15 shows in side elevation the rake-operating mechanism for the machine shown in Figs. 13 and 14, the machine being shown in dotted lines; and Fig. 16 is a cross-section, taken about on line $y\ y$ of Fig. 13, looking toward the right. Figs. 17 and 18 are detail sectional side views of appliances for transferring the material upwardly from one trough to another. Fig. 19 is a side elevation, and Fig. 20 a front or end view, of an arrangement of a double set of squeezing-rolls for the end of the machine when two sets of such rolls are required.

The means for transferring the material from one to another of a plurality of superposed scouring or washing troughs will not only depend upon the path such material is to take, either from the upper trough downward or from the lower trough upward, according as one or the other mode may be found most convenient, but also upon the condition of the fibrous material. If such material is in a partially-cleansed condition, so as not to require the separation of the liquor swept out of the several troughs with and by the material and so as not to require the squeezing out of the dirty liquor from such material as it is passing from one trough to another, then the delivery end of the upper trough $d$ may be directly connected by a suitable chute or trunk 2 with the receiving end of the trough $d'$ below and, similarly, the delivery end of the trough $d'$ with the receiving end of the trough $d^2$, as shown in Fig. 1.

Any suitable arrangement of immersing and propelling rakes may of course be used to immerse and propel the material from the receiving to the delivery end of the respective troughs—as, for instance, the rake and rake-operating mechanism shown in Fig. 8 and hereinafter to be described. In this arrangement of superposed washing-troughs squeezing-rolls at the delivery end of the upper and intermediate washing-troughs are of course dispensed with, while such rolls $f^2 f^3$ are arranged at the delivery end of the lower trough $d^2$, the liquid squeezed out of the material flowing into a vessel $v^2$ and thence into tank T. The liquid carried over the delivery end of the upper trough by the material swept over said end passes, with said material, directly into the intermediate trough, thence into the lower trough, from the latter to the squeezing-rolls, and thence to tank T. From the tank T the liquor is carried back to the upper trough by any suitable means—as, for instance, by a centrifugal pump P, having its suction-pipe connected with the tank T some distance above its bottom and near its end opposite to that where the squeeze-rolls $f^2 f^3$ are located, while its force-pipe $g^{10}$ is connected with the upper trough $d$ at the feed end thereof, as will hereinafter be more fully described. On the other hand, should it be desirable to use squeezing-rolls at the delivery end of the upper and intermediate troughs $d$ and $d'$ such rolls $f$ and $f'$ are arranged at said ends, Fig. 2, the material passing from between the said rolls into a chute or trunk 3 to the feed end of the trough next below. In this arrangement we preferably divide the tank T into three compartments $t$, $t'$, and $t^2$ and mount the squeeze-rolls $f$ and $f'$ in boxes or vessels $v$ and $v'$, as is the case with the squeeze-rolls $f^2 f^3$, and connect said vessels by means of pipes $p$ and $p'$, respectively, with the tank-compartments $t$ and $t'$, so that the liquid squeezed out of the material and swept over the delivery end of the several troughs with such material will flow directly into their respective tank-compartments. In this arrangement we also provide means for returning the liquor in the several tank-compartments to their respective washing-troughs by means of pumps P P' P², as will hereinafter be more fully described. We have found that in this arrangement the material swept over the delivery end of the troughs to their squeeze-rolls is liable to be carried into the aforesaid boxes or vessels in which said squeeze-rolls are mounted, and this we avoid by arranging a spindle or roller $l$, provided with radial arms, in front of and slightly above the nip of the squeeze-rolls $f$ and $f'$ to strike the material upward, clear it from the squeeze-rolls, and throw said material into the upper hopper-like portion of the trunks 3.

The washing-troughs $d\ d'\ d^2$ described in respect of Figs. 1 and 2 may each be provided with a settling-tank. In the arrangement shown in Fig. 1 the contents of said settling-tank may from time to time be discharged into the main tank T through pipes $d^6$ and $d^7$, no pipe connection being required for the settling-tank of the lower trough $d^2$ owing to its proximity to the main tank T. In the arrangement shown in Fig. 2 the settling-tanks $d^4$ of the troughs $d\ d'\ d^2$ are, as hereinafter more fully described, adapted to discharge into the compartments of the tank T, into which is discharged the liquor swept over the delivery end of the troughs and squeezed out of the material. Suitable feed and delivery lattices $e$ and $e^3$ are provided at the feed and delivery end of the upper and lower troughs $d$ and $d^2$, respectively.

In the description of the drawings certain figures have been designated as "side elevations" and the side of the machine shown therein will be hereinafter referred to as the "front" side for convenience and to distinguish the same from the opposite side.

In the machines described and to be described we have shown three scouring or washing troughs, because we find that the combined length of the troughs is sufficient to admit generally of a thorough scouring or washing of the wool or other fibrous material, yet we do not desire to limit the invention to this particular number of troughs, as a greater or less number may be employed.

In the machine shown in Figs. 3 to 6, to which reference is now made, as well as to Figs. 7 to 12, the main or supply tank T is shown as partly sunk below the floor-level for convenience of access to the upper washing-troughs, though this is not absolutely necessary, as will hereinafter appear. The tank T is preferably divided by partitions $t^3$ into three compartments $t$, $t'$, and $t^2$ and constitutes the base of the machine, while its compartments $t\ t'\ t^2$ pertain to the scouring or washing troughs $d\ d'\ d^2$, respectively. The compartment $t$ of the tank T is connected by a pipe $p$ with the collecting vessel or trough $v$, arranged below the squeezing-rolls $f f'$ at the delivery end of the upper trough $d$. The compartment $t'$ is connected by a pipe $p'$ with the like vessel or trough $v'$ below the squeezing-rolls $f f'$ at the delivery end of the trough $d'$, and the compartment $t^2$ is connected directly with the collecting vessel $v^2$ below the squeezing-rolls $f f'$ at the delivery end of the trough $d^2$, Fig. 3. The tank T has its bottom inclined from its rear wall nearly to its front wall to form a flat-bottomed gutter or channel at the lowermost portion of the tank-bottom along said front wall, Figs. 6 and 7, and in each partition $t^3$, as near as possible to the lowermost portion of said tank-bottom, are arranged a disk valve V, normally closing a suitable outlet-port, and a steam-injector whose nozzle 6 projects into a cone 5, leading to said port for the purpose of transferring the liquor from one compartment into the other, so that the less foul liquor from compartment $t'$ may be transferred to compartment $t$, and the still less foul liquor in compartment $t^2$ to compartment $t'$, the fresh liquor being supplied to said compartment $t^2$, while the liquor unfit for further use is drawn from compartment $t$ through an outlet or purge port located near the right-hand end of said compartment in the flat lowermost part of the tank-bottom, said port being normally closed by a disk valve $b$, connected to a rod $b'$, whose upper end is screw-threaded and works in a correspondingly-threaded stand $b^2$, supported from the upper edge of the front side wall of the tank T. There is a similar valve in the other two compartments $t'\ t^2$ for the discharge from time to time of the solid impurities precipitated from the liquid therein and to afford a means for cleansing said compartments.

The arrangement of the valve V above referred to with its injector-nozzle is shown in Figs. 10 to 12, in which $t^3$ indicates one of the partitions of tank T, in which is formed a suitable port normally closed by said valve, to which is connected one arm of a bell-crank lever $b^4$, whose other arm is connected to an actuating-rod $b^5$, the upper end of which is screw-threaded and works in a correspondingly-threaded stand $b^6$, supported from tank T. To the inlet side of the valve-port is secured a short tube 5, having a flaring mouth, into which projects an injector-nozzle 6, connected to or forming part of a steam-supply pipe 7, that passes through a suitable coupling whose flange 8 is secured to the front wall of the tank, so that its injector-nozzle 6 will lie in the axial plane of the tube 5, leading to the port of valve V, the two injectors being supplied with steam through any suitable pipe or pipes connected with the steam-supply and which we have deemed unnecessary to show in the drawings.

Supposing the liquid in compartment $t$ to have become too foul for further use, its purge-valve $b$ or plug is opened and the compartment is emptied, whereby the sediment collected, or most of it, is also carried out, after which the purging-port is closed. The valve V in the partition $t^3$ between said compartment $t$ and the compartment $t'$ is now opened and the liquid in $t'$ will flow into compartment $t$ until the level in both compartments will be the same; but in order to assist the flow of liquid from one compartment to the other and with a view to emptying or nearly emptying the one from which the liquid is discharged steam is turned on and the injector in compartment $t'$ set to work to force as much of the liquid therein as possible out of the same. After compartment $t'$ is emptied as nearly as this can be done the valve V is closed and the one in partition between compartments $t'$ and $t^2$ opened and the liquid in compartment $t^2$ forced into $t'$, after which the valve is closed and fresh liquid supplied to said compartment $t^2$.

As more clearly shown in Figs. 6 and 7, the width of the tank T relatively to that of the washing-troughs $d\ d'\ d^2$ is such as to leave a space on opposite sides of the lower trough $d^2$ and the lateral tank-walls in order to afford ready access to the tank-bottom for purposes of cleansing.

Each of the compartments $t\ t'\ t^2$ is connected to a rotary or centrifugal pump P, P', and P$^2$, respectively, by pipes $g$, $g'$, and $g^2$, and the force-pipes $g^{10}\ g^{11}\ g^{12}$ are respectively connected with a chamber or casing G at the feed end of each washing-trough $d\ d'\ d^2$, as more clearly shown in Fig. 14 and partly in Fig. 4.

The washing-troughs $d\ d'\ d^2$ are supported by cross-rods $c'$, secured to standards $c$, rising from the lateral walls of the tank T in pairs near the opposite ends of said tank, and the fibrous material is fed to the upper trough through the medium of a well-known feed-lattice $e$ and is carried away from the squeezing-rolls $f f'$ at the delivery end of the lower trough $d^2$ by a similar lattice $e^3$. The washing-troughs are all alike in construction, each having a portion of its bottom perforated, except that the perforated area of the bottom of the upper trough $d$ is greater than the like area of the other troughs, because the dirty material is fed to said upper trough first, so that there will be a greater amount of solid dirt in the liquid of said trough than in that of the others, the arrangement of the troughs, as will be readily understood, being such that the fibrous material passes downwardly from trough to trough. This, however, is not absolutely necessary, as the material may pass upwardly, suitable appliances, hereinafter to be described, being provided to forward or transfer the material from one trough to another. In this case the lower trough $d^2$ will have the greatest perforated area, and the compartment $t^2$ will receive the foulest water, the arrangement of the troughs, feed and delivery lattices, &c., being changed to suit the altered direction of feed and discharge of the fibrous material. On one side of each washing-trough is a settling-tank $d^4$, whose bottom $d^{14}$ beneath the perforated portion $d^3$ of the bottom of the trough is inclined nearly to the front wall of said trough, as more clearly shown in Fig. 7, the lowermost flat portion of said bottom having an outlet-port near one end of the tank to which is connected a pipe that extends into the compartment of the tank T pertaining to that particular trough. Thus the settling-tank $d^4$ of the upper trough $d$ is in communication with the tank-compartment $t$ through pipe $d^6$ and the like tank of trough $d'$ with the compartment $t'$ of said tank T through pipe $d^7$, said settling-tanks $d^4$ for troughs $d$ and $d'$ being arranged about midway between the ends of their respective troughs, while the settling-tank $d^4$ for the lower trough. Hence the perforated section of its bottom is arranged near the delivery end of said trough, and as the latter is very close to the main tank T a pipe connection is not necessary. The discharge-openings in the settling-tanks $d^4$ are each controlled by a suitable valve operated by a crank-handled screw-rod $h^5$, the same as the valves V or purge-valves $b$ above described, so that the sediment in said settling-tanks $d^4$ can be discharged from time to time into their respective main tank-compartments.

The fibrous material as it is swept or floated over the higher delivery end $d^9$ of the washing-troughs $d$ and $d'$ slides down the reverse incline into a recurved chute H. (More clearly shown in Figs. 8 and 9.) The bottom of this chute H constitutes the said reverse incline $h$ and is hinged to the delivery end of the trough at $h'$, and from said reverse incline $h$ to the inward bend or curve of the chute its bottom is perforated, as shown at $h^2$, and forms, so to speak, a "false" bottom for a pocket formed in rear thereof, which pocket has an opening in its lateral walls, to which are connected pipes $h^3$, that discharge into the collecting vessel $v$ or $v'$ below the squeezing-rolls $f$ and $f'$ for the troughs $d$ and $d'$, said vessels, as hereinbefore stated, being in communication with the compartments $t$ and $t'$ of the tank T. The front of the chute H is preferably open nearly to the point of its inward bend and discharges at the nip of the aforesaid squeezing-rolls, and in the bottom of the chute H along the discharge edge are formed slots or slits $h^{55}$. By means of this transfer-chute the bulk of the liquid carried out of the troughs is drained from the material before it reaches the nip of the squeeze-rolls $f$ and $f'$.

In scouring or washing fibrous materials dirt is liable to accumulate at the nip of the squeezing-rolls and is carried therethrough with the material, which becomes stained. With the described construction of chute this is avoided, because all the dirty liquid that is not drained through the chute-bottom $h^2$ is in front of the squeezing-rolls, and as said chute-bottom is slotted at that point the liquid passing through the slots takes the dirt along with it as fast as it accumulates and at the same time prevents the fibrous material from floating in front of the squeezing-rolls, which would materially interfere with its properly entering between said rolls. The squeezed-out fibrous material passes from said rolls onto an upwardly-inclined endless feed-lattice $e'$, that carries it to the feed end of the trough next below, as shown in Fig. 3. In a similar manner the material passing through chute H and from the squeezing-rolls of the intermediate trough is delivered to the lower trough by a lattice $e^2$, the delivery end of the upper trough projecting sufficiently beyond the feed end of the intermediate trough and the delivery end of the latter beyond the feed end of the lower trough to admit of the arrangement of the lattices $e'$ and $e^2$.

Figure 20:
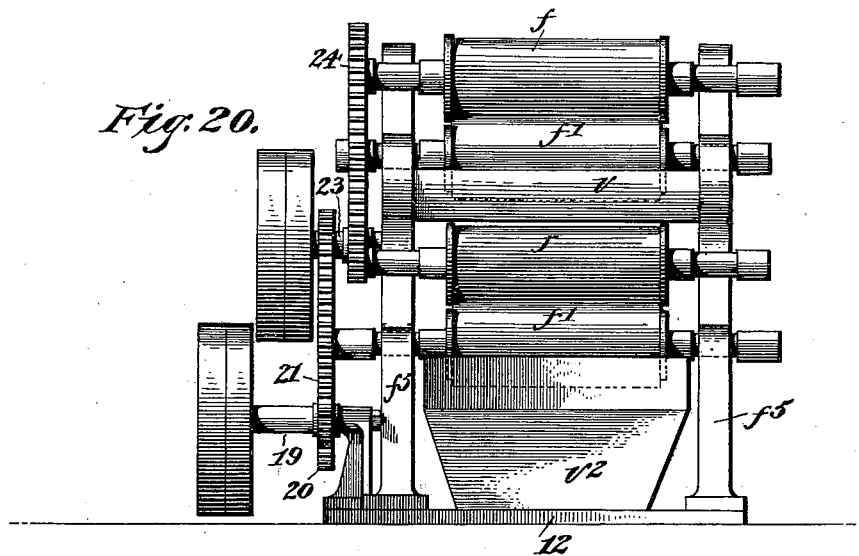

The squeezing-rolls $f$ and $f'$ at that end of the machine—i. e., at the right-hand end, Figs. 3 and 4—where but one pair of such is used are driven in the usual manner—as, for example, from a driving-shaft 9, carrying fast and loose pulleys and a pinion 10 in gear with a wheel 11 on the journal of the lower squeezing-roll, Fig. 4. At the end of the machine where two pairs of squeezing-rolls are used—i. e., the left end, Figs. 3 and 4—namely, the squeezing-rolls at the feed end of the intermediate trough $d'$ and those at the delivery end of the lower trough $d^2$— we preferably support the four rolls from one and the same frame, as shown in Figs. 19 and 20.

From a suitable base 12 rise two standards $f^5$, provided with bearings for the journals of the lower roll $f'$ of each set of rolls $f f'$, and to the said standards levers $f^6 f^7$ are fulcrumed in pairs at $f^{16}$ and $f^{17}$, respectively, each pair of levers being provided on their under side with a bearing for the journals of the upper roll $f$ of each set. The outer end of levers $f^6$ is slotted or forked or has a hole vertically through it for a rod $f^8$, whose lower end has a stirrup in which rests a lever 13, likewise fulcrumed to the standards, and from the free end of said levers 13 is suspended a weight-carrier 4. The rods $f^8$ project above the levers $f^6$, are screw-threaded at their upper end, and carry an adjusting-nut 14, two abutment-disks, and a coiled spring $f^9$ of proper tension between said disks, said tension of the spring being adjustable through the medium of the nut 14. The levers $f^7$ are similarly connected with weighted levers 15, fulcrumed to the base 12, the weights 16 being carried by rods 17, stepped on the free ends of said levers 15 and guided in brackets on the frame-standards. The connecting-rods 18, that connect the levers $f^7$ with their weighted levers 15, are likewise suspended from springs $f^{19}$, whose tension is adjustable by means of nuts $14^a$. The lower rolls are driven from a stub or short shaft 19, that carries a fast and loose belt-pulley and a pinion 20 in gear with a wheel 21 on the journal of the lower roll $f'$ of the lower set of rolls. The upper set of rolls are driven in substantially the same manner from a pinion on a driving-shaft 23 in gear with a wheel 24 on a journal of the lower squeezing-roll $f'$ of the upper set.

The rakes R R' R² are all constructed alike—namely, of two longitudinal tubular girths $i$, to which are secured the rake-heads $i'$—and at its rear end each rake is provided with an immerser $i^3$, consisting, preferably, of a box whose rear wall projects above the rake-frame and whose bottom is perforated and provided with teeth.

There is of course a rake for each washing-trough, and these rakes are so operated that their points will describe the ellipsoidal path shown in dotted lines at $i^4$, Fig. 5, through the following instrumentalities, reference being had to said Fig. 5.

In the foot of the standards $c$ $c$, near the feed and delivery end of the machine from which the washing-troughs are supported, we provide bearings for two cross-shafts S and S', that carry at opposite ends and sides of the machine radial arms $k$ and $k'$, respectively. A cross-shaft $k^2$ has its bearings in the upper end of the arms $k$, and a like cross-shaft $k^{11}$ has its bearings in the upper end of the arms $k'$. At the front end of the shaft $k^2$ is fulcrumed a three-armed lever L, and upon the like end of shaft $k^{11}$ is fulcrumed a similar lever L', while upon the opposite ends of each of said shafts and opposite side of the machine is fulcrumed a two-armed lever. (Not shown.) The arm 27 of lever L is connected by a rod 28 with the corresponding arm 29 of lever L', and the arm 25 of said lever L is connected to a crank $k^4$ on a crank-disk carried by a stub-shaft $k^5$, that has its bearings in a bracket-arm on one of the standards $c$, and said shaft carries a gear-wheel 30, that meshes with a pinion 31 on the hub or sleeve of a driving-pulley 32 on a stub-shaft that has its bearings likewise in one of the standards, said driving-pulley being loose on its stub-shaft, which also carries a loose belt-pulley 33, Fig. 6. The gear-wheel 30 meshes with an idle gear 34 and the latter with a gear 35 on a stub-shaft $k^9$, that likewise has its bearings in one of the standards $c$.

The crank-shaft $k^9$ has a crank the wrist-pin $k^8$ of which carries a block that is connected with and has sliding motion in the end of a lever $k^7$, which is of the same length as the horizontal arms 25 26 of lever L, whose arm 26 is connected by a rod 36 with the opposite end of the aforesaid lever $k^7$. The levers $k^7$ and L have the same movements imparted to them by their respective cranks $k^8$ $k^4$, and the sliding block on crank-pin $k^8$ serves to counteract any irregularity in their movements. The levers $k^7$ L are further connected together near their crank connections through the medium of two cross-shafts 37 and 38, respectively, and a connecting-rod $k^6$ on opposite sides of the machine at each end of said cross-shafts, to which latter the upper and lower rake-frames R and R² are respectively secured.

As heretofore stated, the cross-shaft S carries also a two-armed lever on the rear side of the machine, corresponding with lever L, the arms of which lever are connected by rods corresponding with the rods $k^6$ and 36 (one of which is shown in Fig. 6) with a two-armed lever corresponding with the lever $k^7$; but of course said two-armed levers on the rear side of the machine have no crank connections. The arrangement of levers, cranks, and connections forms, as will be readily understood, a parallel motion. The connecting-rod 36 and its companion rod on the rear side of the machine have bearings for a third cross-shaft $38^a$, to which the intermediate rake-frame R' is connected. At the feed end of the machine the three-armed lever L' on shaft $k^{11}$ has its horizontal arms 39 and 40 connected by rods $39^a$ and $40^a$ with three cross-shafts 41, 42, and 43, respectively attached to the intermediate and lower and upper rakes R', R², and R.

As previously stated, the shaft S' carries at its opposite end—i. e., on the rear side of the machine—a two-armed lever whose arms, corresponding to those 39 and 40 of lever L', are, like the latter, connected with the several cross-shafts 41, 42, and 43 by connecting-rods corresponding with those $39^a$ and $40^a$, so that through the connecting-rod 28, which connects the depending arms 27 and 29 of levers L and L', motion is transmitted to the rake-operating devices last above described at the feed end of the machine. This motion is such as to impart to the rakes R' and R² a short rectilinear forward or propelling movement toward the delivery end of the machine, then an upward movement in a curvilinear plane, then a rectilinear backward movement and a curvilinear downward immersing movement, &c., so that each of the rake-teeth will describe an ellipsoidal path substantially as hereinbefore referred to for well-known purposes, while the movements of the intermediate rake R' are reversed—that is to say, its propelling motion is in the direction of the feed end of the machine, as is required.

In machines of the construction described we may provide for ready supervision a gallery whose floor is about on a level with the liquid in the intermediate washing-trough T', as will be described hereinafter.

Referring now to Figs. 13 to 16, in which we have shown a scouring or washing machine that differs from those hereinbefore described merely in certain details and in the rake-operating mechanism, whereby a more efficient working, as well as simplification of parts, is obtained. In the construction of machine shown in these figures there is a lower tank T', the bottom of which is likewise inclined—for instance, from the rear nearly to the front side of the machine—to form a flat-bottomed gutter at the lowest point of said tank-bottom, which is provided with a discharge-port $t^{42}$, normally closed by a purge-valve operated by a crank-handled screw-rod $d^5$, substantially as hereinbefore described. In this tank T' is arranged the lower washing-trough $d^{22}$ in such a manner as to leave a clear space $t^{43}$ between it and the front wall of the tank, the bottom $d^{33}$ of the trough being perforated throughout its length except for a short distance at its delivery end. At the latter end of the tank T' is arranged the collecting-tank $v^2$, which receives the liquid swept over the delivery end of the washing-trough $d^{22}$ with and squeezed out of the material by the squeezing-rolls $f$ and $f'$ at said delivery end, said collecting-tank being connected directly with the washing-tank T'. On the rear side of the tank T' is arranged a settling-tank $T^2$ open at top and divided into two compartments $a$ and $a'$ of unequal length, the bottom $a^{41}$ of said tank $T^2$ being inclined downwardly from the rear wall of tank T', which wall forms the front wall of said settling-tank, nearly to the rear wall of tank $T^2$ to form a flat-bottomed gutter at the lowest point of said bottom $a^{41}$, there being likewise a discharge-port in each of the compartments $a$ and $a'$ of tank $T^2$, normally closed by a purge-valve operated by means of a crank-handled screw-rod. The upper and intermediate washing-troughs $d^{20}$ $d^{21}$, which, like the lower trough $d^{22}$, are also provided with perforated bottoms $d^{33}$, are likewise arranged in washing-tanks $T^3$ $T^4$ in such a manner as to leave between them and the rear wall of said tank a clear space $t^{24}$. The bottoms of both tanks $T^3$ $T^4$ are inclined rearwardly and downwardly nearly to their rear walls to form a flat-bottom gutter, in which is formed an opening normally closed by a purge-valve operated by a crank screw-rod $d^5$. The purge port and valve and their controlling rods for the washing-troughs $d^{20}$ and $d^{21}$ are located near their delivery ends, as shown in Fig. 13, and to said ports are connected pipes $d^{16}$ and $d^{17}$, that extend into the settling-compartments $a$ and $a'$, respectively, of settling-tank $T^2$, said pipes $d^{16}$ $d^{17}$ being respectively connected with pipes leading to the collecting vessels $v$ and $v'$ under the squeezing-rolls $f$ and $f'$ at the delivery end of the troughs $d^{20}$ and $d^{21}$ to conduct the liquid carried over the said end with and squeezed out of the material into the respective settling-compartments $a$ $a'$ of the supply-tank $T^2$. From said compartments $a$ and $a'$ the liquid is pumped back to the troughs $d^{20}$ and $d^{21}$, respectively, by means of two centrifugal or rotary pumps P P', whose suction-pipes $g$ $g'$ are connected with said compartments, while their force-pipes $g^{10}$ $g^{11}$ are connected with a chamber at the feed end of the troughs $d^{20}$ $d^{21}$, respectively, said chambers having in their front wall a transverse row of perforations. In a similar manner the liquid in collecting vessel $v$ is pumped back to tank T' by pump $P^2$ through pipe $g^2$.

The intermediate washing-tank $T^4$ is supported from cross-girths $m^4$, resting on pillars $m$ and $m'$, rising from the side walls of the lower washing-tank T', and the upper washing-tank $T^3$ is supported directly from pillars $m^2$ $m^3$, rising from the side walls of the intermediate washing-tank $T^4$, which is a very simple yet very strong and stable arrangement for the built-up machine.

For purposes of supervision of and for affording access to the upper tanks $T^3$ $T^4$ and to the feed and delivery lattices and squeezing-rolls thereof there is a gallery $n$ built around the entire machine and provided with a suitable hand-rail $n'$.

The fibrous material is fed to the upper washing-trough $d^{20}$ in tank $T^3$ at the right-hand end by the usual feed-lattice $e$ and delivered at the delivery end to squeezing-rolls $f$ and $f'$, from which the material is delivered onto an outwardly and downwardly inclined lattice 46 and from the latter to a reversely-inclined lattice 47 to the feed end of the intermediate trough $d^{21}$ in tank $T^4$. From the delivery of the latter trough $d^{21}$ the material is delivered to and conducted by similar reversely-inclined lattices $46^a$ and $47^a$ to the feed end of the lower trough $d^{22}$ in tank T' and from the delivery end of the latter trough to the squeezing-rolls $f$ and $f'$ and the delivery-lattice $e^3$.

At the delivery end of the machine, where the squeezing-rolls for the upper and lower troughs are located, the said rolls may be arranged as hereinbefore described in reference to Figs. 19 and 20.

The propelling and immersing rakes R, R', and $R^2$ may be of any desired construction, or they may be constructed as hereinbefore described, the required and described movement being imparted to said rakes through the following mechanism. (Shown more particularly in Figs. 15 and 16.) A cross-shaft $q$ has its bearings on a suitable bracket projecting from the pillars $m$, near the delivery end of the machine, close to the lower washing-tank T', and said shaft carries at its rear end (rear side of the machine, Figs. 13 and 16) a gear-wheel $q'$, meshing with a pinion $q^2$, fast on a sleeve or on the hub of a belt-pulley $q^3$, that is loosely mounted on a stub-shaft, which also carries a loose belt-pulley. The shaft $q$ carries, furthermore, a bevel-pinion 48 (shown in Fig. 16) and two three-sided or heart-shaped cams or eccentrics C, one near each end and side of the machine, which cams or eccentrics work in square straps Q, the sides of the cams contacting with the sides of their respective straps, Fig. 15. The straps Q are connected together on opposite sides by cross-rods $q^9$, which latter are attached to the longitudinal tubular bars $i$ of the frame of the lower rake $R^2$, which therefore moves with said straps Q to and up and fro and down under the action of the cams C. Midway of its length the upper cross-bar of the straps Q on each side of the machine is connected to the lower end of a connecting-rod $q^6$, whose upper end is connected to a cross shaft or rod $q^4$, that is also attached to the longitudinal tubular girths $i$ of the frame of the upper rake R. To the lower end of the connecting-rods $q^6$ and straps Q on each side of the machine is jointed a rock-lever $q^5$, that carries about midway of its length a roller $q^{15}$, which latter rides on a track or ledge on the pillars $m$, Fig. 13. The other end of the levers $q^5$ is jointed to the lower ends of connecting-rods $q^{16}$, whose upper ends are jointed to a cross-rod $q^{17}$ and to the outer ends of connecting-rods $p^{18}$, whose inner ends are jointed to the rods $q^6$ about midway of their length, the cross-rods $q^{17}$ being attached to the longitudinal tubular girths $i$ of the frame of the intermediate rake R', near its rear or immersing end. On a second cross-shaft $q^\times$ above the upper rake R, near the feed end of the machine, are secured two cams C', similar to the cams C above described, that likewise work in straps Q', similar to straps Q, connected at opposite sides to cross-bars $q^{19}$ $q^{19}$, attached to the upper rake-frame. The lower cross-bars of this strap are connected through vertical rods $q^8$ with a cross-bar $q^{28}$, that is attached to the longitudinal girths $i$ of the frame of the lower rake $R^2$, while the upper cross-bars of the straps Q' are connected by rocking levers $q^{29}$ with rods $q^{20}$, jointed to cross-bars $q^{21}$, attached to the girths $i$ of the frame of the intermediate rake R', the aforesaid rock-levers $q^{29}$ carrying each a roller $q^{39}$, that ride on tracks $q^{49}$, secured to the side walls of the upper washing-tank $T^8$. The shaft $q^\times$, at its rear end and side of the machine, carries a bevel-pinion 49, meshing with a like pinion 49$^a$ at one end of an inclined shaft $q^7$, which carries at its lower end a bevel-pinion 48$^a$, meshing with the bevel-pinion 48, hereinbefore referred to, on the shaft $q$, near the delivery end of the machine.

It will readily be seen that by the arrangement of the rake-operating mechanism described the upper and lower rakes R and $R^2$ will move synchronously, while the movements of the intermediate rake R' are reversed relatively to the movements of said upper and lower rakes, so as to propel the material toward the feed end of the machine, as required.

We have hereinbefore stated that the material treated may be taken from the lower to the intermediate washing-trough and from the latter to the upper washing-trough without departing from the spirit of our invention and without altering the general construction of the machine, except in so far as the means for transferring the material from one trough to another in an upward direction are concerned and in that the location of the feed and delivery lattices will be reversed, the former being arranged to feed to the lower washing-trough and the latter or delivery-lattice being arranged to deliver from the upper trough. The means for this upward transfer of the material are shown in Figs. 17 and 18, in which two arrangements of appliances are shown for this purpose. In Fig. 17 the material from the squeezing-rolls $f$ and $f'$ at the delivery end of the lower feed-trough $d^2$ is delivered onto an endless lattice $e^4$, traveling around guide-rolls $e^6$ in an arc of a circle partly around a revoluble transferring-drum $e^5$, which delivers said material to an upwardly-inclined lattice $e^7$, from which it is delivered to the intermediate washing-trough $d'$, at the feed end thereof, similar means being provided at the delivery end of said washing-trough $d'$ or $d^{21}$ to transfer the material to the upper trough $d$ or $d^{20}$.

In Fig. 18 the material is delivered from the squeezing-rolls $f$ and $f'$ onto a lattice $e^{14}$, is taken by and between two endless lattices $e^8$ $e^{55}$, and transferred to the feed-lattice $e^7$ for the intermediate trough, similar means being provided at the delivery end of said trough for the transfer of the material to the upper trough, as will be readily understood.

Having thus described our invention, what we claim as new therein, and desire to secure by Letters Patent, is—

1. In combination, a plurality of superposed washing-troughs, means for propelling the material from the feed to the delivery end of the respective troughs, and means for transferring such material from the delivery end of one trough to the feed end of the next adjacent trough, for the purpose set forth.

2. In combination, a plurality of superposed washing-troughs, a pair of squeezing-rolls at the delivery end of each of said troughs and means for automatically transferring the material from the squeezing-rolls of one trough to the feed end of another, for the purpose set forth.

3. In combination, a plurality of superposed feed-troughs the feed end of one arranged above or below the delivery end of another, means for transferring the fibrous material from the delivery end of one trough to the feed end of another, and an immersing and propelling rake operating to immerse the fibrous material fed to a trough at its feed end and propel the same to and sweep it over its delivery end, for the purpose set forth.

4. The combination with three superposed washing-troughs and means for automatically transferring the fibrous material from one trough to another successively; of an immersing and propelling rake for each trough, and mechanism for imparting to the rakes the compound immersing and propelling motion specified, the to-and-fro movements of the intermediate rake being reversed relatively to the like movements of the upper and lower rakes, for the purpose set forth.

5. The combination with three superposed washing-troughs and means for automatically transferring the fibrous material from one trough to another successively; of a rake for each trough, and mechanism substantially such as described for simultaneously imparting to said rakes the compound motion specified, the to-and-fro movements of the intermediate rake being reversed relatively to the like movements of the said upper and lower rakes, as set forth.

6. The combination with a plurality of superposed washing-troughs, the feed end of one arranged above or below the delivery end of another, and squeezing-rolls at the delivery end of each trough; of a chute leading from the delivery end of a trough to the nip of its squeezing-rolls, means for transferring the squeezed-out fibrous material to the feed end of the next succeeding trough, and a rake for each of said troughs operating to immerse the fibrous material fed thereto and propel the same along and sweep it over said delivery end into the aforesaid chute, for the purpose set forth.

7. The combination with a plurality of superposed washing-troughs, the feed end of one arranged above or below the delivery end of the next succeeding trough, and squeezing-rolls at the delivery end of each trough; of a chute leading from such delivery end to the nip of said rolls, said chute having a portion of its bottom between the rolls and delivery end perforated, and in the edge of its bottom at the nip of the rolls a row of slits or slots, for the purpose set forth.

8. The combination with a plurality of superposed washing-troughs, the feed end of one arranged above or below the delivery end of the next succeeding trough and projecting beyond the same, squeezing-rolls at and below the delivery end of each trough, and means for transferring the fibrous material from said rolls to the feed end of the next succeeding trough; of an inwardly-curved chute leading from said delivery end of a trough to the nip of its squeezing-rolls, the bottom of said chute intermediate of the rolls and delivery end being perforate, and the outer edge of said bottom at the nip of said rolls provided with a row of slits or slots, a pocket or chamber in rear of the perforated bottom portion, a collecting vessel below the squeezing-rolls and a pipe or pipes connected with said pocket and discharging into said vessel, for the purpose set forth.

9. The combination with a plurality of superposed washing-troughs, the feed end of one arranged above or below the delivery end of the next succeeding trough, squeezing-rolls at the delivery end of each trough, and means for transferring the fibrous material from said rolls to the feed end of the next succeeding trough; of a collecting vessel below each set of squeezing-rolls, a supply-tank for each of said collecting vessels, and pipes leading from the latter into their respective supply-tanks, for the purpose set forth.

10. The combination with a plurality of superposed washing-troughs, the feed end of one arranged above or below the delivery end of the next succeeding trough, squeezing-rolls at the delivery end of each trough and means for transferring the fibrous material from said rolls to the feed end of the next succeeding trough; of a collecting vessel below each set of squeezing-rolls, a supply-tank for each of said collecting vessels, pipes leading from the latter into their respective supply-tanks, and means for returning the liquid from said tanks to their respective troughs, for the purpose set forth.

11. The combination with a plurality of superposed washing-troughs, the feed end of one arranged above or below the delivery end of the next succeeding trough, said troughs having part of their bottoms perforated, a settling-tank on one side of each trough extending underneath its perforated bottom portion and means for propelling the fibrous material along and transferring the same from one trough to another successively; of a supply-tank for each trough, valved pipe connections connecting the settling-tank of a trough with a supply-tank, and means for returning the liquid from the latter tanks into their respective troughs, for the purpose set forth.

12. The combination with a plurality of washing-troughs having a portion of their bottoms perforated, the feed end of one trough arranged above or below the delivery end of the next succeeding trough, a settling-tank alongside each trough extending under its perforated bottom, squeezing-rolls at the delivery end of the troughs, a rake for and adapted to propel the fibrous material from the feed to and over the delivery end of a trough to the squeezing-rolls, a collecting vessel below said squeezing-rolls, and transferring devices for transferring the material from the squeezing-rolls at one end of a trough to the feed end of the next succeeding trough; of a supply-tank for each trough, pipes and valved pipes respectively connecting the collecting vessel and settling-tank of a trough with its supply-tank, and forcing devices for forcing the liquid in the second settling-tanks to their respective troughs, for the purpose set forth.

13. The combination with a plurality of superposed washing-troughs having a portion of their bottoms perforated, the feed end of one tank above or below the delivery end of the next succeeding trough, a settling-tank alongside of and extending under the perforated portion of the bottom of a trough and the collecting vessels $v$ $v'$ $v^2$; of a supply-tank provided with a compartment for each trough, each of said compartments in communication with the settling-tank and collecting vessel of a trough, forcing appliances for forcing the liquid in compartment connected with the settling-tank and collecting vessel of the last of the troughs into the compartment connected with the like tank and vessel of the next succeeding trough and so on, and forcing devices for forcing the liquid in the several compartments back to their respective troughs, for the purpose set forth.

14. The combination with the upper and lower washing troughs or tanks, and the squeezing-rolls at the delivery end thereof; of a pair of standards having bearings for the journals of the lower squeezing-rolls of the two sets of such, weighted levers having bearings for the upper rolls, two shafts each carrying two belt-pulleys loose thereon, a pinion rigidly connected with each of said belt-pulleys, and a transmitting-gear between a belt-pulley pinion and a gear on a journal of the lower squeeze-rolls, substantially as set forth.

15. The combination with the upper and lower washing-troughs and their squeezing-rolls, of a framing consisting of a bed-plate and two standards, the latter having bearings for the journals of the lower squeezing-roll of each set, levers fulcrumed to the standard and having bearings for the journals of the upper roll of each set, weighted levers fulcrumed to the base-plate and standards respectively, and a resilient connection between the said weighted and journal-bearing levers, substantially as and for the purpose set forth.

16. The combination with the upper and lower washing-troughs and their squeezing-rolls, of a framing consisting of a bed-plate and two standards, the latter having bearings for the journals of the lower squeezing-roll of each set, levers fulcrumed to the standard and having bearing for the journals of the upper roll of each set, weighted levers fulcrumed to the base-plate and standards respectively, connecting-rods passing freely through the free end of the journal-bearing levers and connected with the weighted levers, an adjusting-nut on the upper threaded end of the connecting-rods and a coiled spring interposed between said nut and the said journal-bearing levers, substantially as and for the purpose set forth.

17. The combination of superposed tanks, a washing-trough in each of them, means for propelling the material from the feed to the delivery ends of the respective troughs, and means for transferring said material from the delivery end of one trough to the feed end of the next adjacent trough, for the purpose set forth.

18. In combination, a plurality of superposed washing-troughs, a receiving-tank for each trough, means for conducting liquid from the troughs to their respective tanks, a supply-tank for fresh liquid, means for returning the contents of the tanks to their respective troughs, and means for supplying one of said tanks with fresh liquor from the supply-tank.

19. In combination, a plurality of superposed washing-troughs, a receiving-tank for each trough, means for conducting liquid from said troughs to their respective receiving-tanks, a supply-tank for fresh liquid, means for returning the contents of the tanks to their respective troughs, and means for transferring the liquid in the supply-tank to one of the receiving-tanks and means for transferring the liquid in said receiving-tanks from one tank to another, for the purpose set forth.

20. The combination with superposed washing-troughs, the feed end of one arranged above or below the delivery end of the next succeeding trough, squeezing-rolls at the delivery end of each trough and a rake mechanism adapted to sweep the fibrous material from the feed to and over the delivery end of the respective troughs; of a receiving-tank for each of said troughs, means for conducting the liquid swept over the delivery end of the troughs and squeezed out of the fibrous material by the squeezing-rolls to their respective receiving-tanks, means for returning such liquid back to their respective troughs, a supply-tank for fresh liquid, means for transferring such fresh liquid to the receiving-tanks, and means for draining the tanks independently of one another.

21. The combination with superposed washing-troughs the feed end of one arranged above or below the delivery end of the next succeeding trough, squeezing-rolls at the delivery end of each trough and a rake mechanism adapted to sweep the fibrous material from the feed end to and over the delivery end of the respective troughs; of a receiving-tank for each of said troughs, means for conducting the liquid swept over the delivery end of the troughs and squeezed out of the fibrous material by the squeezing-rolls to their respective receiving-tanks, means for returning such liquid back to their respective troughs, a supply-tank for fresh liquid, means for transferring such fresh liquid to one of the tanks, means for transferring the liquid in said tanks from one to the other, and means for draining the receiving-tanks independently of one another, for the purpose set forth.

22. The combination with the tank $T'$ and the tanks $T^4$ $T^3$ supported from each other and from said tank $T'$, and the squeezing-rolls and their stands at the delivery end of each of said tanks; of a gallery extending around the intermediate tank and its squeezing-rolls, and having its floor below the upper edge of such tank, for the purpose set forth.

23. The combination with the rakes R, R' and R², the cross-rods $q^9 q^{28}$ attached to rake R², the cross-rods $q^{17} q^{21}$ attached to rake R', the cross-rods $q^4 q^{19}$, and the cross-shafts $q$ $q^\times$ carrying the cams C, C'; of the straps Q, Q' for said cams, the rod $q^6$ connecting strap Q with cross-rod $q^4$, the parallel connected rods $q^{18} q^5$, the former connected with cross-rod $q^{17}$ and the latter carrying a roller $q^{15}$ traveling on a fixed track, said strap Q also connected with cross-rods $q^9 q^9$, the said strap Q' connected to cross-rods $q^{19} q^{19}$ and by lever $q^8$ with cross-rod $q^{28}$, said strap Q' also connected through levers $q^{29} q^{20}$ with cross-rod $q^{21}$, the levers $q^{29}$ carrying a roller traveling on a fixed track, the shaft $q^7$, a bevel-pinion at each end thereof in gear with a like pinion on the cross-shafts $q$ and $q^\times$ respectively, and means for imparting motion to shaft $q$, substantially as and for the purpose set forth.

In testimony that we claim the foregoing as our invention we have signed our names in presence of two subscribing witnesses.

WILLIAM McNAUGHT.
    THOMAS WHITEHEAD HAWKINS.

Witnesses:
    PETER J. LIVSEY,
    WILLIAM FAULKNER.